United States Patent
DeSano et al.

(10) Patent No.: US 11,877,562 B2
(45) Date of Patent: Jan. 23, 2024

(54) VERTICAL DISPLACEMENT ACCESS BEEHIVE

(71) Applicant: Melovator LLC, Madison, WI (US)

(72) Inventors: Dominic M. DeSano, Madison, WI (US); Jeffrey E. Gunderson, Stoughton, WI (US)

(73) Assignee: Melovator LLC, Madison, WI (US)

( * ) Notice: Subject to any disclaimer, the term of this patent is extended or adjusted under 35 U.S.C. 154(b) by 58 days.

(21) Appl. No.: 17/564,150

(22) Filed: Dec. 28, 2021

(65) Prior Publication Data

US 2022/0211012 A1    Jul. 7, 2022

Related U.S. Application Data

(60) Provisional application No. 63/133,641, filed on Jan. 4, 2021.

(51) Int. Cl.
*A01K 47/06* (2006.01)

(52) U.S. Cl.
CPC .................................. *A01K 47/06* (2013.01)

(58) Field of Classification Search
CPC ...... A01K 47/06; F16M 11/046; F16M 11/38; F16M 2200/024; F16M 2200/063; B66F 9/08
USPC ................................. 449/26, 32; 254/30, 31
See application file for complete search history.

(56) References Cited

U.S. PATENT DOCUMENTS

| | | | | |
|---|---|---|---|---|
| 1,153,024 | A | * 9/1915 | Brown | B66C 1/48 254/31 |
| 4,161,310 | A | * 7/1979 | Parker | E04H 17/265 254/30 |
| 4,409,697 | A | * 10/1983 | Bouwens | A01K 55/00 449/64 |
| 5,022,632 | A | * 6/1991 | Beideck | E01F 9/60 254/132 |
| 5,464,192 | A | * 11/1995 | Burnham | E04H 17/265 254/30 |
| 5,713,559 | A | * 2/1998 | McClarin | E04H 17/265 254/129 |
| 5,794,918 | A | * 8/1998 | Price | E04H 17/265 254/113 |
| 8,801,493 | B2 | 8/2014 | Vincent | |
| 2011/0312244 | A1 | * 12/2011 | Vincent | A01K 47/02 449/32 |
| 2021/0259216 | A1 | * 8/2021 | Waring | A01K 47/02 |

* cited by examiner

*Primary Examiner* — Brady W Frazier
*Assistant Examiner* — Zoe Tam Tran
(74) *Attorney, Agent, or Firm* — Stiennon & Stiennon

(57) ABSTRACT

A beehive assembly has a column of hive bodies which are releasably connected to a vertical metal spine. Upper and lower metal pivot members extend between the spine and a post mounted to the ground. The upper pivot members extend away from the post and include a removable handle. Depressing the handle causes the column of hive bodies to ascend into an operating position where the bee colony within the hive bodies is elevated above the ground. Raising the handle brings the hive column to a lowered position for access by a beekeeper. A latch or latches are disposed to secure the pivot members with respect to the post at desired elevations. Springs extending between the post and the spine assist the beekeeper when raising or lowering the hive and cushion the lowering.

20 Claims, 6 Drawing Sheets

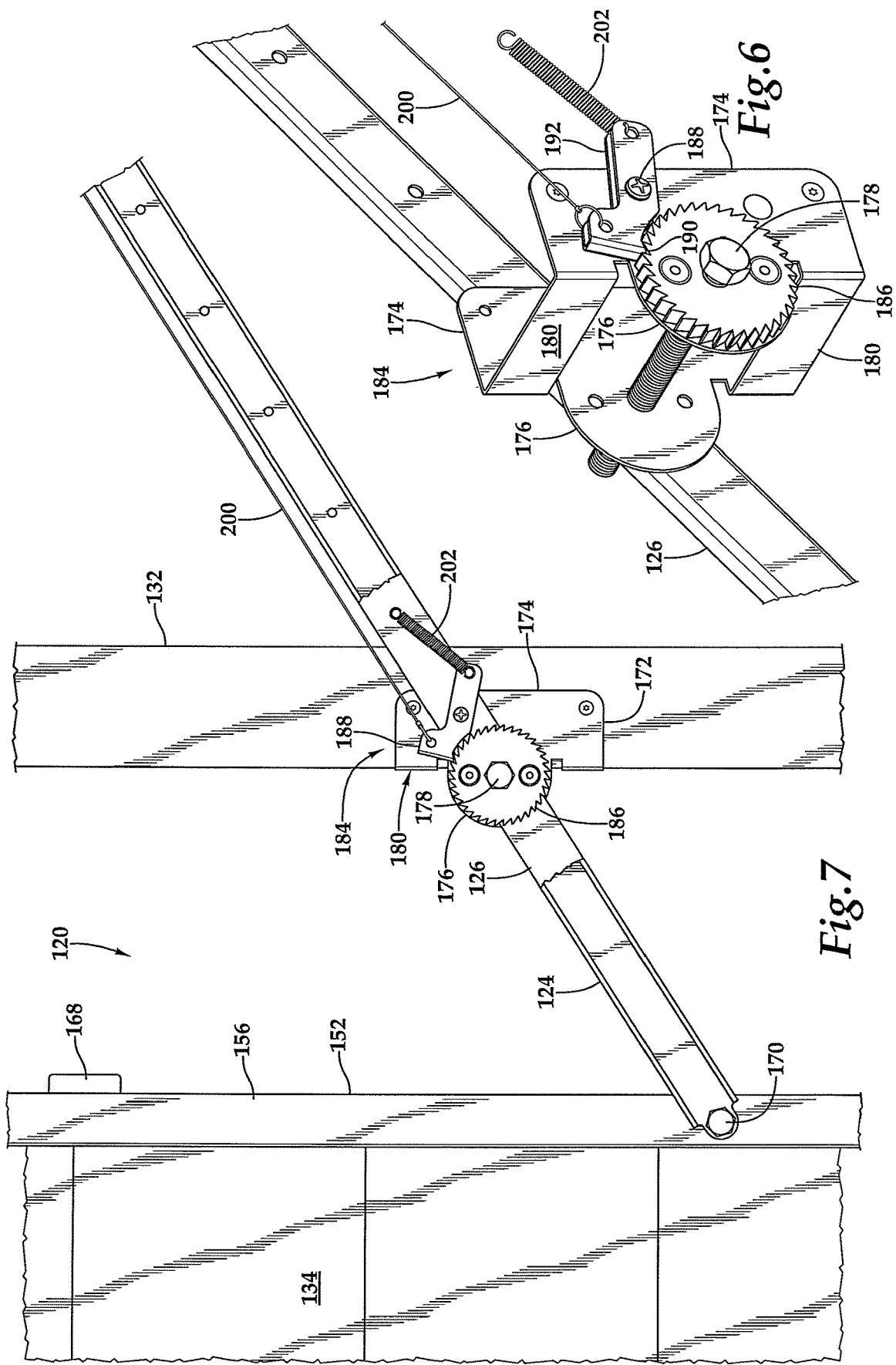

VERTICAL DISPLACEMENT ACCESS BEEHIVE

CROSS REFERENCES TO RELATED APPLICATIONS

This application claims the benefit of priority of U.S. provisional App. No. 63/133,641, filed Jan. 4, 2021, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to beehives and more particularly to beehive structures which can be supported in an elevated configuration.

Honeybees provide an essential pollination service for many crops. Yet these complex communities of insects are subject to many environmental hazards, including competition from rodents, other insects, and agricultural chemicals. In nature, bee colonies will form their hives in trees or other elevated locations, where pressure from ground dwelling creatures can be minimized. Moreover hives too close to the ground are exposed to condensation and moisture which can cause problems for bees. Artificial culturing of bees has been practiced for thousands of years, and typically involves constructed hive bodies which are supported on frames or supports placed at ground level. Vertical arrangements of hive bodies are also known which can be pivoted from a horizontal configuration for access and harvesting of honey, and an upright configuration for optimal flourishing of the hive. Yet other arrangements which preserve the integrity of the hive column and which are readily transposed between access and operation configurations are needed.

SUMMARY OF THE INVENTION

A beehive assembly has a column of hive bodies which are releasably connected to a vertical metal spine. Upper and lower metal pivot members extend between the spine and a post mounted to the ground. The upper pivot members extend away from the post and have a handle mounted thereto. Depressing the handle causes the column of hive bodies to ascend into an operating position where the bee colony within the hive bodies is elevated above the ground. Raising the handle brings the hive column to a lowered position for access by a beekeeper. Latches are disposed to secure the pivot members with respect to the post at desired elevations, or a ratchet mechanism allows any desired position. By elevating the hive column the bees are given a more sustainable environment, elevated above main ground dwelling pests, and more readily defended by the bees. In addition, the adjustable height of the hive column improves accessibility to the hive bodies.

It is an object of the invention to provide a modular beehive which can be readily displaced from a lowered position where it is accessible by a beekeeper, to an elevated operating position.

Another object of the invention is to provide a beehive which offers the beekeeper mechanical advantage in raising and lowering hive bodies.

It is a further object of the present invention to provide a height adjustable beehive arrangement for resiliently lowering of the hive bodies.

Further objects, features and advantages of the invention will be apparent from the following detailed description when taken in conjunction with the accompanying drawings.

BRIEF DESCRIPTION OF THE DRAWINGS

FIG. 6 is a fragmentary isometric view of post hardware for the beehive assembly of FIG. 5

FIG. 7 is a fragmentary side elevational view of the beehive assembly of FIG. 5.

DESCRIPTION OF THE PREFERRED EMBODIMENTS

Figure 1:
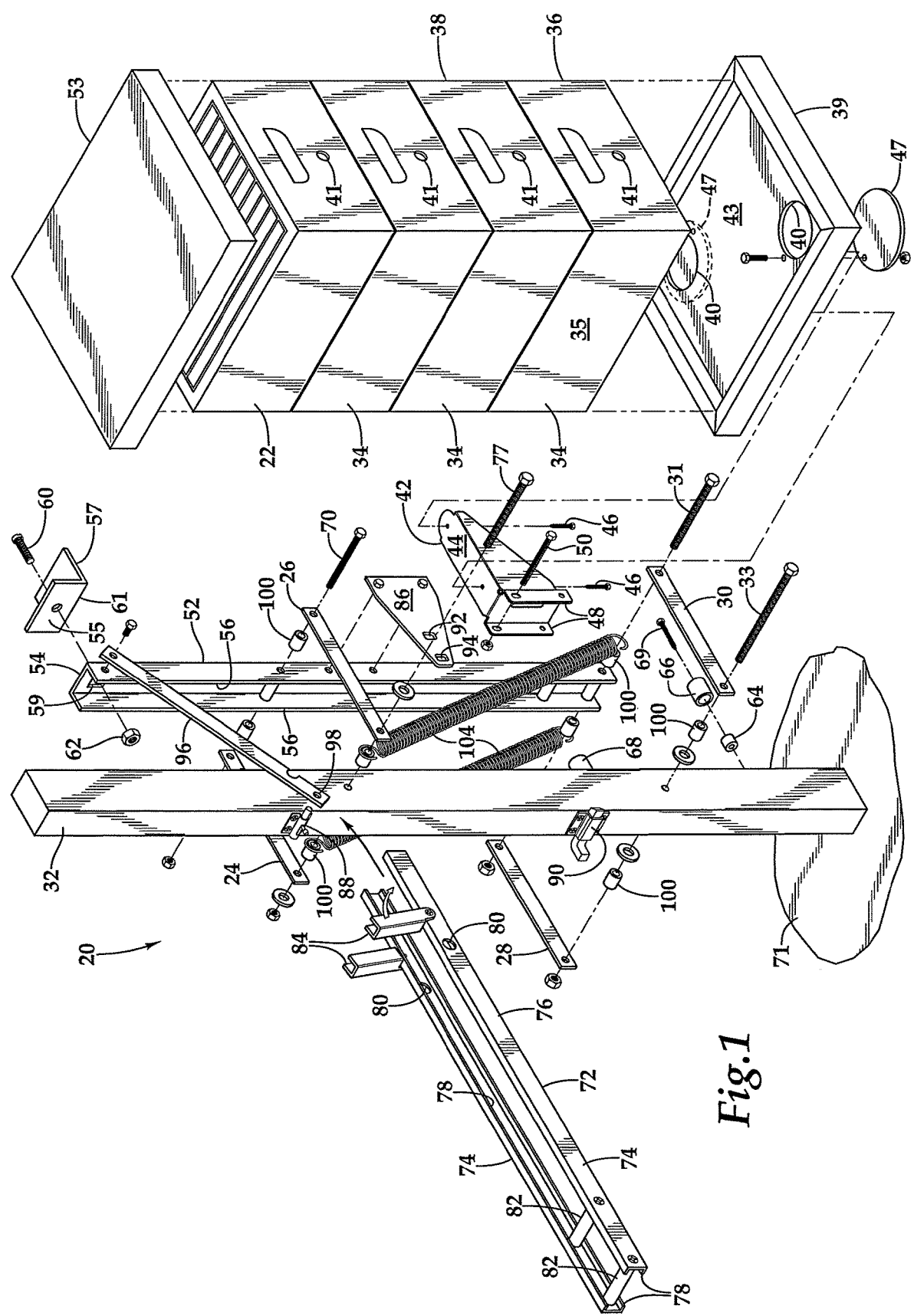
FIG. 1 is an exploded isometric view of a beehive assembly of this invention.
Figure 2:
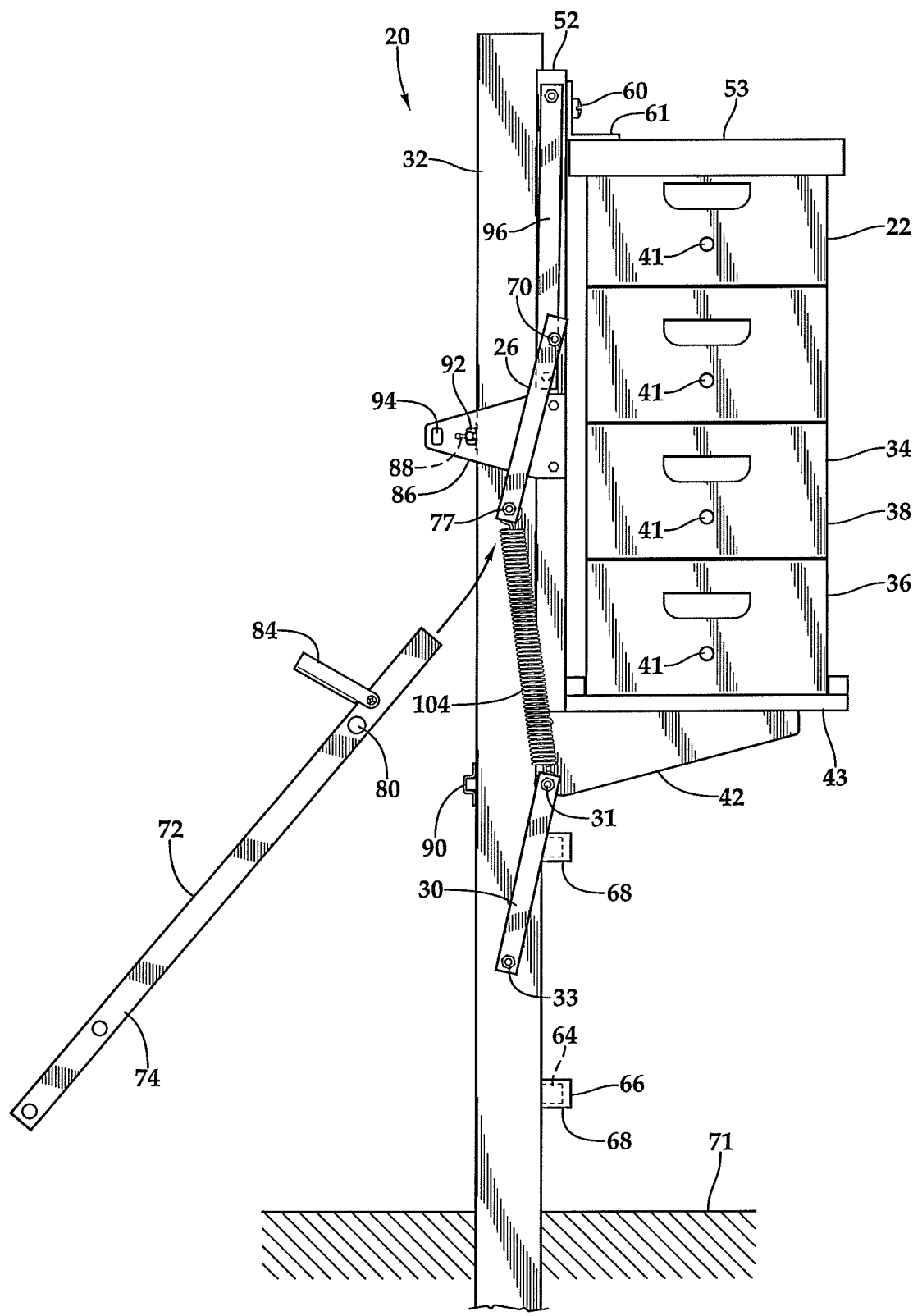
FIG. 2 is a side elevational view of the beehive assembly of FIG. 1 in an elevated position, with a removable handle shown exploded away from its operating configuration.

Referring more particularly to FIGS. 1-7, wherein like numbers refer to similar parts, a beehive assembly 20 is shown in FIGS. 1-4. As shown in FIG. 2, the beehive assembly 20 has a hive column 22 with a spine 52 mounted by a parallel linkage of pivot members 24, 26, 28, 30 to an upright post 32 to permit the hive column to be adjusted from an elevated operating position to a lowered access position. The upper pivot members 24, 26, are connected by a bolt 70 to the spine, and by a bolt 77 to the post. The lower pivot members 28, 30 are connected by a bolt 31 to the spine, and by a bolt 33 to the post.

Figure 3:
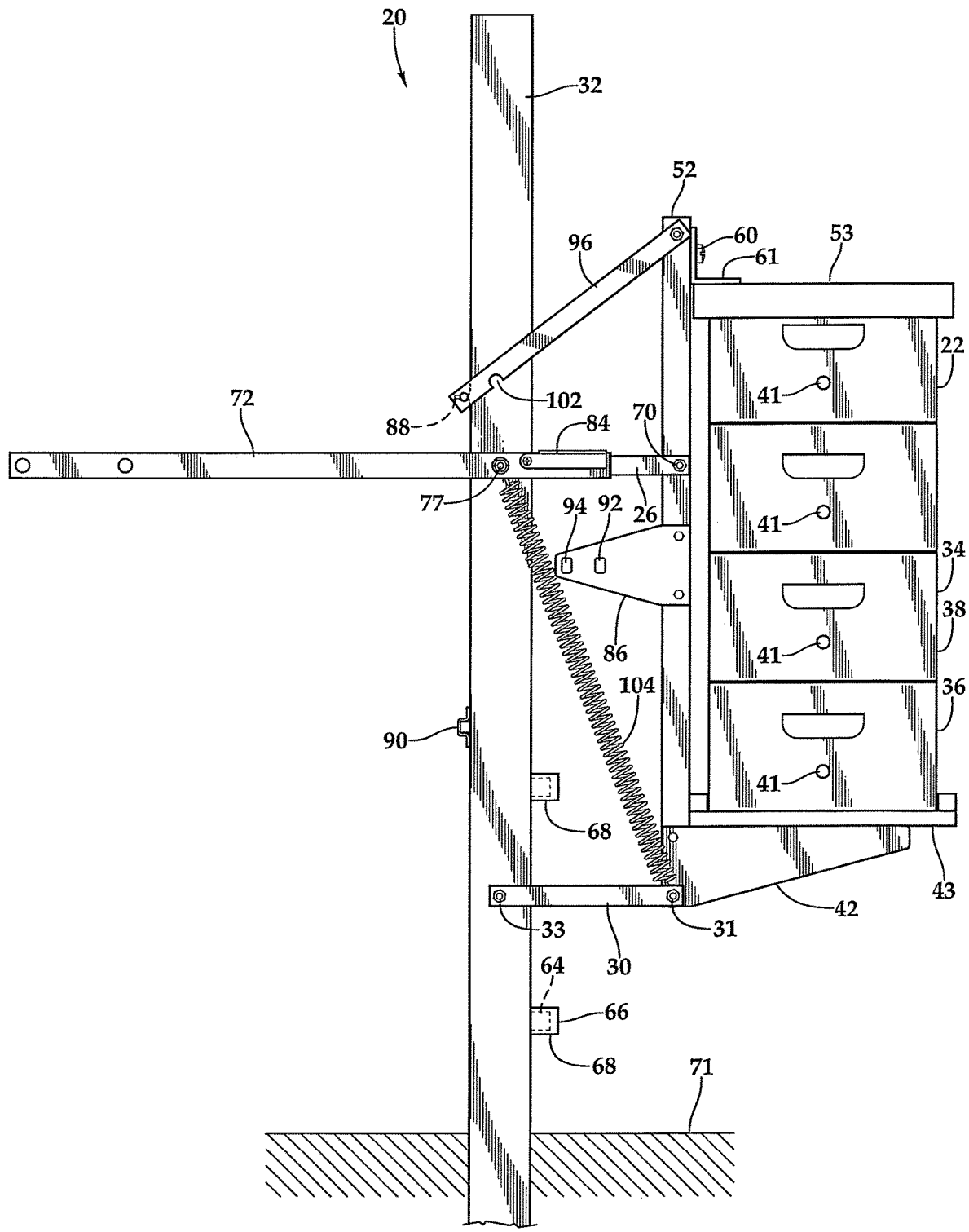
FIG. 3 is a side elevational view of the beehive assembly of FIG. 2 shown in a midpoint position with handle engaged.

As shown in FIG. 3, the hive column 22 is made up of a plurality of vertically stacked hive bodies or boxes 34. The boxes 34 are generally polygonal and may be rectangular as shown and formed of wood panels in a conventional manner, for example Langstroth hive bodies of standard dimensions. The boxes 34 include a first box 36 which rests on a base assembly 39 which has a horizontal bottom wall 43 which has two main access openings 40 for the entrance of bees into the hive column. As shown in FIG. 1, each main access opening 40 has an associated cover 47 pivotably mounted, for example by a bolt, to the bottom wall 43 of the base assembly 39. The beekeeper may adjust the positions of the covers 47 to give greater or lesser area of access to the hive column and thereby adjust the ventilation of the hive column. A second box 38 and subsequent boxes are similar to the first box, and each has a smaller access opening 41, and all communicate with the neighboring boxes. Each box 34 is configured to receive portions of a beehive colony therein, and may be provided with conventional frames supporting the honeycomb which the bees will produce. Each box is preferably provided with a protruding lip along its top perimeter which nests within a suitable relief on the superposed box, to allow secure engagement between the boxes which can restrict inflow of air and which the bees can seal in their usual course. The overlying boxes within the hive column communicate with one another to allow the passage of bees between boxes.

The first box 36 is closed on its lower side by a bottom wall 43 which is supported by a base bracket 42. The base bracket 42 has a top wall 44 with fasteners 46 extending therethrough into the base assembly 39. The base bracket 42 has rear flanges 48 which are fastened such as by bolts 50, 31 to the upwardly extending spine 52, to thereby fix the base bracket to the spine. The box on the top of the hive column is closed with a cover 53.

Figures 4, 4A:
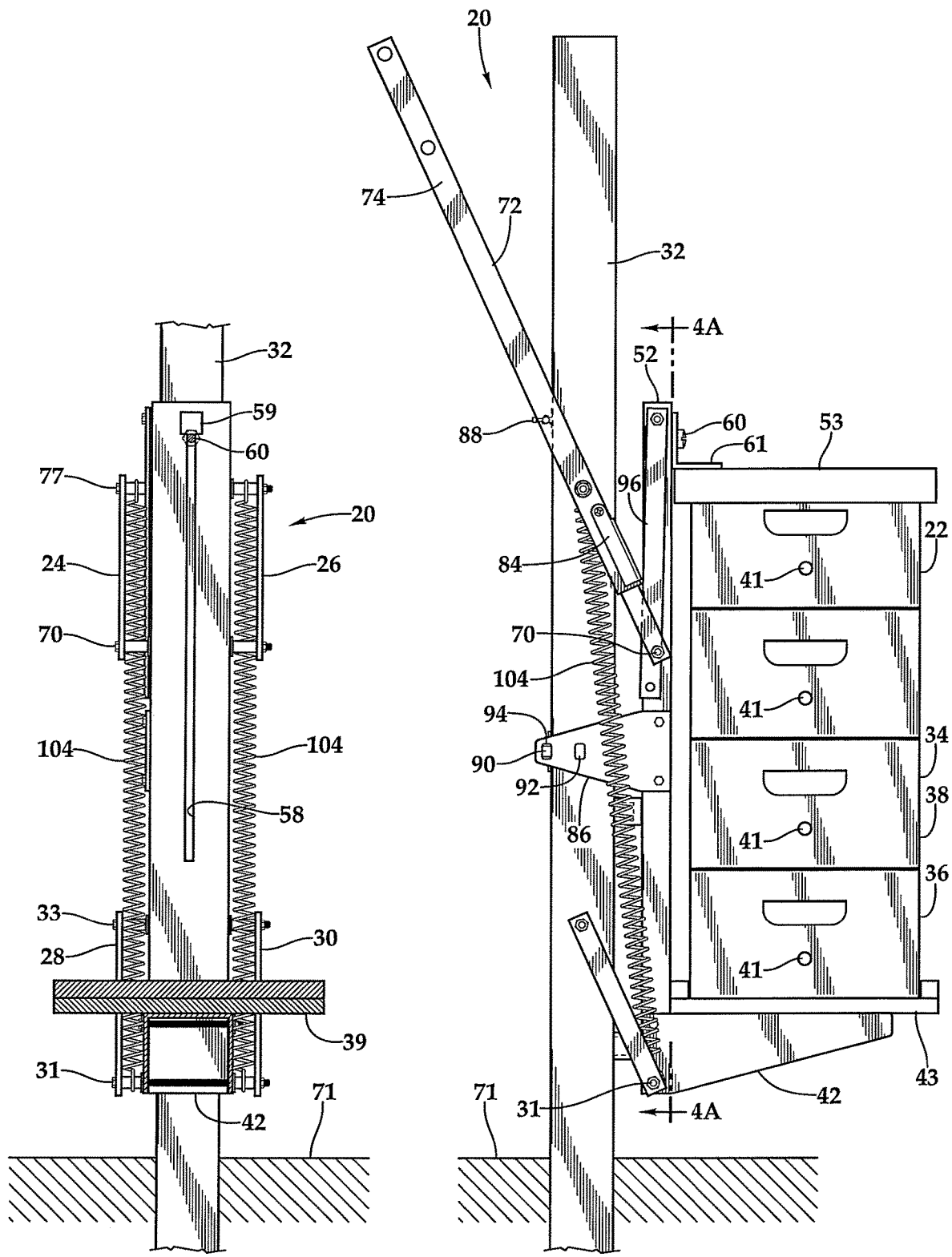
FIG. 4 is a side elevational view of the beehive assembly of FIG. 3 shown in a lowered position with handle engaged.
FIG. 4A is a cross-sectional view of the beehive assembly of FIG. 4 taken along section line 4A-4A.

The spine 52 is preferably a formed metal sheet and has an upwardly extending central panel 54 which extends adjacent a vertical panel 35 of the first box 36. The spine 52 has two stiffening side webs 56 which are parallel to one another and which extend from the central panel towards the post 32. As shown in FIG. 4A. portions of the spine central panel 54 define a vertically extending slot 58 positioned between the two webs. The slot 58 has an enlarged nut passthrough segment 59. A bracket 61 is disposed on a side of the spine 52 opposite the post and has a vertical segment 55 which overlies the spine central panel 54 and a horizontal segment 57 which extends over the hive column. A fastener 60 extends from the bracket vertical segment through the spine slot and is adjustable to releasably secure the bracket 61 to the spine to clamp the hive column in position with respect to the spine. A nut 62 is threaded on the fastener 60 and may be extended through the nut passthrough segment 59 of the slot 48. The fastener 60 may be a slotted pan-head screw which can be loosened and tightened by a conventional hive tool allowing the beekeeper to conveniently release the bracket and allow the removal of hive bodies. When the boxes 34 are fastened to the spine 52 an effectively rigid column assembly is created which allows the hive column 22 to be securely raised and lowered while retaining its structural integrity.

Bumpers 68 may be fastened to the post 32 to retain a clearance between the hive column and the post when the hive column is at its extreme upper and lower positions, and to cushion any engagement between the hive column 22 and the post 32. Each bumper 68 has a wooden dowel or block 64 which is connected by a central screw 69 to the post facing the spine. A rubber or vinyl plastic tube 66 surrounds the block 64 and extends beyond the block, allowing the tube 66 to engage and resiliently compress to absorb a shock when it engages the spine.

The hive column 22 is connected by a parallel linkage to the post 32 the four metal pivot members. As shown in FIG. 2, the first upper pivot member 24 and the second upper pivot member 26 are pivotably connected to the opposite side webs 56 of the spine 52 at about the vertical midpoint of the hive column by the bolt 70. The first lower pivot member 28 and the second lower pivot member 30 are pivotably connected to the opposite side webs 56 of the spine 52 at the base of the hive column, near the base bracket 42 by the bolt 33.

The post 32 may be a 4 by 6 treated timber member (actual dimensions 3.5 by 5.5 inches) which may be 10 or 12 feet tall, with three or four feet of the post being submerged within a post hole in the ground 71 depending on conditions. At least 6 or 7 feet needs to be exposed above ground. In situations where the user does not want to plant a post in the ground, alternatively the post may be mounted in a free-standing post frame. The distances between the pivot points of the upper mounting arms and the lower mounting arms are the same on the post 32 as they are on the spine 52.

The lower pivot members 28, 30 do not extend beyond the post on the side away from the hive column, but a handle 72 is removably connected to the upper pivot members 24, 26 to provide an extension beyond the post a distance greater than the distance between the spine and the mounting bracket to define lever arms which gives the beekeeper mechanical advantage in adjusting the position of the hive column. As shown in FIG. 1, the handle 72 has two parallel rails 74 which are connected by two bolts which extend between cylindrical cross members 82. Each parallel rail 74 is a steel U-channel having a central member 76 with two flanges 78 spaced apart to receive one of the upper pivot members. Each central member 76 of a rail 74 has a circular clearance opening 80 to allow the bolt 70 to extend without engaging the central members. The ends of the rails 74 of the handle 72 opposite the cross members can be extended alongside the upper pivot members in a telescoping fashion so the rails overlie the two upper pivot members, such that they are received within the rail U-channels and the ends of the bolt 70 protrude through the clearance openings 80. To retain the handle 72 in place, two U-channel mounting segments 84 are provided. Each mounting segment 84 is pivotally mounted to a rail central member at a point between the clearance openings and the post side ends of the rails 74. With the parallel rails of the handle extending alongside and outwardly of the upper pivot members, the U-channel segments 84 are pivoted into an attached position in which the U-channel segments overlie the rails and secure the rails to the upper pivot members, as shown in FIG. 3. When it is desired to remove the handle, the mounting segments 84 are pivoted away from the upper pivot members, and the handle is drawn away. The cylindrical cross members 82 provide a place for the beekeeper to grip the handle. The cross members 82 are fixed between the handle rails. The distance from the pivot point on the bracket to the attachment point of the handle may be over three times as long as the distance between the pivot point on the bracket and the pivot point on the spine, giving the beekeeper significant mechanical advantage of 3:1.

Two latch mechanisms are mounted to the post 32 which allow the hive column 22 to be secured at one of three discrete elevations. A latch plate 86, shown in FIGS. 1-4, cooperates with either an upper deadbolt 88 or a lower slam latch element 90. The latch plate 86 is fixed to the spine and extends from the spine alongside the post 32. The latch has a first opening 92 for engagement by the deadbolt, and a second opening 94 spaced away from the spine and the first opening, and positioned to engage the slam latch element 90. As shown in FIG. 2, to retain the hive column 22 in its most elevated position, the handle 72 is depressed, raising the base bracket 42 and the hive bodies supported thereon, and causing the latch plate 86 to approach and pass alongside the post 32. When the first opening 92 aligns with the deadbolt 88, the movable projecting member of the deadbolt is actuated by the user to selectively protrude through the first opening of the latch plate, to thereby retain the spine in a first elevated position.

When a beekeeper seeks to bring the hive body into its lowest position, shown in FIGS. 4 and 4A, the deadbolt 88 projecting member is withdrawn, thereby freeing the spine for vertical travel. The latch plate moves downwardly, and then passes alongside the post to bring the second opening 94 into position to be engaged by the slam latch element 90. The slam latch protruding member is spring biased into a protruding position, and has a wedge shape which causes it to extend into the second opening 94 without being directly operated by the user. When this member is extended into the second opening 94 the spine is retained in a second elevated position which is below the first elevated position.

The beekeeper may secure the hive column 22 at a position intermediate between its most elevated and most lowered position, as shown in FIG. 3. This position may be desirable, for example, when the beekeeper wishes to access hive bodies without bending down. To enable this position, a support member 96 is pivotably mounted to the spine above the upper pivot member. The support member 96 may be formed of a metal bar similar to the upper and lower pivot members, although it will be longer than those members. The free end of the support member 96 has a mounting hole 98 which is dimensioned to receive the protruding member of the deadbolt 88 and is positioned so as to retain the upper pivot members 24, 26 approximately horizontal and the hive column at an intermediate position. When the support member 96 is not engaged by the deadbolt, it hangs downwardly on the spine, as shown in FIG. 4. To avoid interference between the support member and the bolt 70 which mounts the upper pivot members to the spine, the support member may be provided with a clearance opening 102 where it engages the bolt 70.

To reduce any pinching hazard, the pivot members 24, 26, 28, 30 are spaced away from the post 32 by metals sleeves 100 which are fitted on the bolts 70, 77, 31 and 33 which mount the pivot members to the post and the spine. The sleeves 100 space the upper pivot members and the lower pivot members from the post a distance greater than the thickness of an adult finger.

To assist in raising and lowering the hive column, and to cushion the extension of the hive column into the lower position, biasing members such as springs 104 may be inserted to extend between the post upper fastener 77 and the spine lower fastener 31 by engaging the spring hooks around the sleeves 100 on the two fasteners. The biasing members urge the spine lower fastener towards the post upper fastener. The biasing members 104 may be extension springs, but could be other biasing members such as continuous force springs, torsion springs, hydraulic or air cylinders.

When a beekeeper wants to access the hive body to care for the bees or to remove honey, the handle 72 is attached to the upper pivot members, and the deadbolt is released. The biasing members 104 are pulling upwards, and thus reduce the load of the hive column as the beekeeper allows it to descend to its lowered position. After the hive has been attended to, the beekeeper can raise the hive column to its elevated position. Again the biasing members 104 serve to assist in this raising. Once the hive column is in its elevated operating position, the beekeeper may release the handle 72 and carry it to the next hive or storage.

Figure 5:
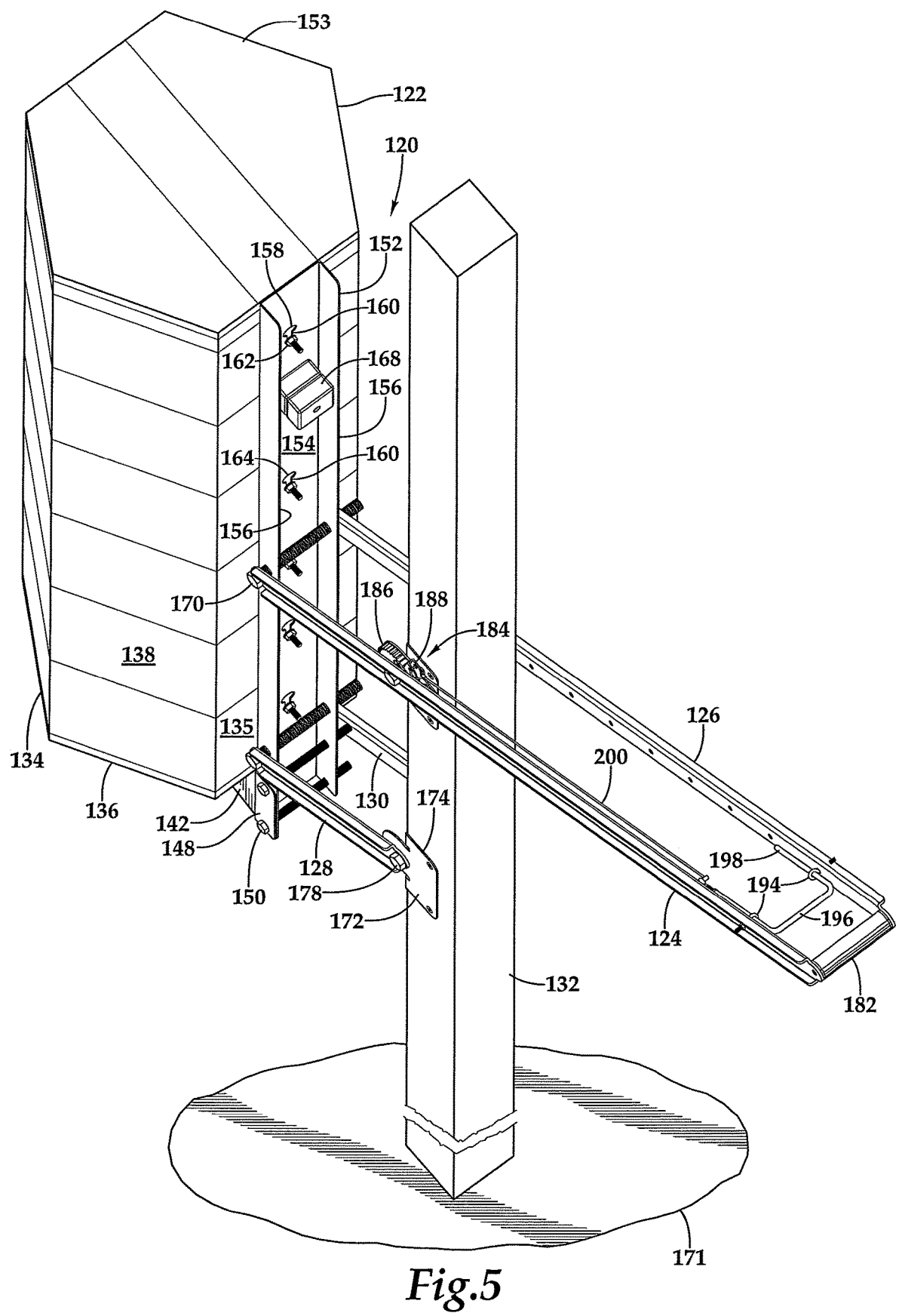
FIG. 5 is an isometric view of an alternative beehive assembly of this invention having a ratchet and handle release arrangement allowing the hive bodies to be positioned at multiple desired elevations.

An alternative embodiment beehive assembly 120 is shown in FIGS. 5-7. As shown in FIG. 5, the beehive assembly 120 has a hive column 122 mounted by a parallel linkage of pivot members 124, 126, 128, 130 to an upright post 132 to permit the hive column to be adjusted from an elevated operating position to a lowered access position and any point in between.

The hive column 122 multiple vertically stacked hive bodies or boxes 134. The boxes 134 are generally polygonal and may be rectangular or, as shown, may be made up of six vertically extending wood panels 135. Alternatively, the boxes may be circular or polygonal in plan or greater than six sides. The boxes 134 include a first box 136 which has a main access opening (not shown) for the entrance of bees into the hive column. A second box 138 and subsequent boxes are similar, having a smaller access opening (not shown), and all communicate with the neighboring boxes.

The first box 136 is closed on its lower side by a bottom wall which is supported by a base bracket 142 similar to the bracket 42 described above and similarly connected to a spine 152.

The spine 152 is similar to the spine 52 described above and has an upwardly extending central panel 154 which extends adjacent a vertical panel 135 of the first box 136. The spine 152 has two side webs 156 which extend from the central panel towards the post 132. Portions of the spine central panel 154 define vertically spaced mounting openings 158 positioned between the two webs. Each mounting opening 158 is configured to receive a fastener 160 which extends outwardly from a box 134, for example a fastener with a wood screw on the box side, and a threaded shank on the spine side, with a nut 162 on the spine side. Each mounting opening 158 has a first segment 164 which is wide enough to permit the nut 162 to pass through, and a second narrower segment 166 positioned beneath the first segment which is wide enough to receive the threaded shank of the fastener. The fastener 160 including the nut 162 allows each box to be releasably fastened to the spine 152. The openings 158 are evenly spaced along the spine, to allow all the boxes 134 which make up the hive column 122 to be individually secured to the spine. When the boxes 134 are fastened to the spine 152 an effectively rigid column assembly is created which allows the hive column 122 to be securely raised and lowered while retaining its structural integrity.

Wooden or rubber bumper blocks 168 which are deeper than the projection of the spine side webs 156 may be fastened to the spine 152 to retain a clearance between the hive column and the post when the hive column is at its extreme upper and lower positions, and to cushion any engagement between the hive column 122 and the post 132.

The hive column 122 is connected by a parallel linkage to the post 132 by four metal C-channel members. As shown in FIG. 5, a first upper pivot member 124 and a second upper pivot member 126 are pivotably connected to the opposite side webs 156 of the spine 152 at about the vertical midpoint of the hive column by a bolt 170. A first lower pivot member 128 and a second lower pivot member 130 are pivotably connected to the opposite side webs 156 of the spine 152 at the base of the hive column, near the base bracket 142 by a bolt 170.

The post 132 may be a 4 inch by 6 inch treated timber member which is about 12 feet tall, with four feet of the post being submerged within a post hole in the ground, and about 8 feet extending above ground.

The pivot members are mounted to the post 132 by two mounting brackets 172 as shown in FIG. 6. Each mounting bracket 172 has two parallel ears 174 which are positioned along two opposite sides of the post 132 and which have two holes to allow wood screws to secure the ears at a desired elevation. Each ear 174 has a tab 176 which extends towards the spine, and which has a central opening which receives a bolt 178 to pivotably mount a pivot member. Two front straps 180 connect the ears 174 and thus cause the opposed ears to be both at the same elevation. The lower pivot members 128, 130 are mounted in a similar way to a mounting bracket 172 fixed to the post beneath the upper pivot members. This distances between the pivot points of the upper mounting arms and the lower mounting arms are about the same on the post 132 as they are on the spine 152.

The lower pivot members 128, 130 do not extend beyond the post on the side away from the hive column, but the upper pivot members 124, 126 extend beyond the post a distance greater than the distance between the spine and the mounting bracket to form lever arms by which a beekeeper can adjust the position of the hive column. The remote ends of the upper pivot members 124, 126 are connected by a cylindrical handle cross member 182 shown in FIG. 4. The handle cross member 182 is fixed between the upper pivot members. The distance from the pivot point on the bracket to the attachment point of the handle may be over three times as long as the distance between the pivot point on the bracket and the pivot point on the spine.

A latch 184 is disposed between the first upper pivot member 124 and the post which allows a beekeeper to position the hive column at a desired elevation with respect to the post. The latch 184 may take the form of any mechanism operable to selectively secure and release the pivot arms, for example, as shown in FIG. 6, a ratchet gear 186 is fixed to a tab 176 of the upper mounting bracket 172, with the center of the ratchet gear being coincident with the pivot axis of the first upper pivot member. As shown in FIGS. 6 and 7, a pawl 188 is pivotably mounted to the first upper pivot member 124. The pawl 188 has a tooth 190 extending from a pawl body 192 where it is mounted to the first upper pivot arm. When the pawl tooth 190 is engaged with the ratchet gear 186, the entire assembly is fixed in place. When the pawl tooth 190 is released from the ratchet gear 186, the assembly may be adjusted.

Inwardly extending eyelets 194 are mounted to the first and second upper pivot members 124, 126, and a U-shaped latch release member 196 is positioned between the upper pivot members closely spaced from the handle 182. The legs 198 of the latch release member travel within the eyelets 194. One of the legs 198 is mechanically linked by a cable 200 to the pawl 192. A tension spring 202 extends between the pawl body and the first upper pivot member 124. The spring 202 urges the pawl tooth 190 into the ratchet gear 186. When a beekeeper pulls the latch release member 196 towards the handle 182, the cable retracts the pawl so the pawl tooth 190 is disengaged from the ratchet gear 186 and the position of the upper pivot members 124, 126, and hence the elevation of the entire hive column can be adjusted. It should be noted that alternatively, the leg 198 may extend directed to the pawl and be pivotably pinned thereto in place of use of the cable 200.

When a beekeeper wants to access the hive body to care for the bees or to remove honey, it is only necessary to engage the handle, and retract the latch release member, thereby making the upper pivot members free so that the handle may be raised to cause the hive column with all the boxes to descend and be brought in close vicinity to the ground where work may be conveniently carried out. Once the beekeeper's work is complete, the handle may be depressed to cause the hive column to ascend and assume an elevated operating position.

It should be noted that the hive column secured to the stiffening spine may be adjusted in elevation on the post by alternative mechanisms: for example, pneumatic or hydraulic actuators, an operable lead screw, or a winch with a cable and pulley assembly. In these other arrangements the spine could cooperate with tracks on the post. The winch or lead screw arrangement may be provided with a motor. The fasteners which connect the boxes to the spine may be fasteners that do not require tools to operate, for example bolts with wingnuts. The latch could alternatively be a ratchet with only a single tooth, or could be a pin which is retractable by the release handle to alternatively insert within a pin hole. The brackets and other non-wooden parts should be outdoor approved materials such as stainless steel, aluminum and plastic.

It is understood that the invention is not limited to the particular construction and arrangement of parts herein illustrated and described, but embraces all such modified forms thereof as come within the scope of the following claims.

We claim:

1. A beehive assembly comprising:
   an upright support post;
   an upright spine;
   a base bracket fixed to the spine;
   a first box supported on the base bracket, the first box defining at least a portion of a hive column and configured to receive portions of a beehive colony therein;
   an upper pivot member pivotably connected to the spine and pivotably connected to the post;
   a lower pivot member pivotably connected to the spine below the upper pivot member, and pivotably connected to the post below the upper pivot member, wherein one of the pivot members is terminated by a handle which extends away from the post, such that the first box is on one side of the post and the handle is on another side of the post, such that raising the handle causes the first box to descend and depressing the handle causes the first box to ascend, the handle being operable to move the first box between a lowered access position and an elevated operating position; and
   a latch disposed to secure the pivot members to thereby position the first box at a desired elevation with respect to the post.

2. The beehive assembly of claim 1 further comprising a latch plate fixed to the spine and extending from the spine alongside the post, the latch plate having portions defining a first opening therein; and
   wherein the latch comprises a first latch assembly mounted to the post and having a movable projecting member which is actuatable by a user to selectively protrude through the first opening of the latch plate, to thereby retain the spine in a first elevated position.

3. The beehive assembly of claim 2 wherein the latch plate has portions defining a second opening therein, the second opening being positioned outward of the first opening in a direction away from the spine; and further comprising a second latch assembly mounted to the post at an elevation below the first latch assembly, the second latch assembly having a protruding member which is extendible into the second opening to retain the spine in a second elevated position which is below the first elevated position.

4. The beehive assembly of claim 1 wherein the upper pivot member and the lower pivot member are connected to the post by bolts having spacing sleeves thereon, the sleeves serving to space the upper pivot member and the lower pivot member from the post a distance greater than the thickness of an adult human finger to thereby reduce pinching risk.

5. The beehive assembly of claim 1 further comprising a base assembly supported on the bracket, and having a bottom wall which underlies the first box, wherein portions of the bottom wall define at least one opening for the passage of bees into the first box; and
   a cover pivotably mounted beneath the bottom wall of the base assembly, the position of the cover being adjustable to underlie the at least one opening by a greater or lesser extent to thereby give greater or lesser area of access to the hive column and thereby adjust the ventilation of the hive column.

6. The beehive assembly of claim 1 wherein the spine has a central panel which extends upwardly along and adjacent a vertical panel of the first box, wherein portions of the central panel define a vertically extending slot; and further comprising:
- a bracket disposed on a side of the spine facing away from the post and having a vertical segment which overlies the spine central panel and a horizontal segment which extends over the hive column; and
- a fastener which extends from the bracket vertical segment through the spine central panel vertically extending slot, the fastener being adjustable to releasably secure the bracket to the spine to clamp the hive column in position with respect to the spine.

7. The beehive assembly of claim 1 further comprising:
a block fastened to the upright support post facing the spine; and
a plastic or rubber tube surrounding the block and extending beyond the block to engage and resiliently compress to absorb a shock when the spine engages the plastic or rubber tube.

8. The beehive assembly of claim 1 further comprising a support member which is pivotably mounted to the spine above the upper pivot member, the support member having a hole at its outer end, wherein the latch comprises a first latch assembly mounted to the post and having a movable projecting member which is actuatable by a user to selectively protrude into the support member hole, to thereby support the hive column at a position between an uppermost position and a lowermost position.

9. The beehive assembly of claim 1 wherein the upper pivot member is pivotably connected to the post about a post upper fastener, and the lower pivot member is pivotably connected to the spine about a spine lower fastener, and further comprising a biasing member extending between the post upper fastener and the spine lower fastener, the biasing member urging the spine lower fastener towards the post upper fastener.

10. The beehive assembly of claim 1 wherein the handle is releasably connected to said one of the pivot members.

11. The beehive assembly of claim 10 wherein the said one of the pivot members is the upper pivot member, and wherein the upper pivot member is pivotably mounted about a post upper fastener which protrudes from the post beyond the upper pivot member, and wherein a second upper pivot member extends between the post upper pivot member and the spine on a side of the upright support post opposite the upper pivot member; and
wherein the handle comprises
a first rail which is a U-channel;
a second rail which is a U-channel, the second rail being parallel to the first rail;
wherein the first rail and the second rail extend away from the upright support post, and wherein each of the first rail and the second rail has a central member, and each central member has a clearance opening therein through which the post upper fastener extends;
a first U-channel segment pivotally mounted to the central member of the first rail; and
a second U-channel segment pivotally mounted to the central member of the second rail, wherein the first rail extends alongside and outwardly of the upper pivot member and the second rail extends alongside and outwardly of the second upper pivot member, and the first U-channel segment and the second U-Channel segment are each pivotable between an attached position overlying the first rail or the second rail respectively to secure the first rail and the second rail to one of the upper pivot member and the second upper pivot member, and a detachable position in which the first U-channel segment and the second U-channel segment are pivoted upwardly.

12. The beehive assembly of claim 1 wherein the upper pivot member comprises a first upper pivot member, and further comprising a second upper pivot member which is parallel to the first upper pivot member and pivotably mounted between the spine and the post, and wherein the handle comprises a member which extends between the first upper pivot member and the second upper pivot member, and further comprising a release handle mounted to the pivot member having the handle, the release handle being mechanically linked to the latch, such that operation of the release handle releases the latch to allow adjustment of the elevation of the first box.

13. The beehive assembly of claim 12 wherein the latch comprises a pawl pivotably mounted to the pivot member having the handle to engage a ratchet gear fixed with respect to the post, and the release handle is mechanically linked to the latch by a cable which extends to the pawl, such that movement of the release handle away from the post releases the pawl from the ratchet gear to permit the adjustment of the elevation of the first box.

14. A beehive assembly comprising:
an upright support post;
an upright metal spine having a central segment, and two parallel side webs;
a base bracket fixed to the spine;
a first box supported on the base bracket, the first box being configured to receive portions of a beehive colony therein;
a clamp releasably securing the first box with respect to the spine;
an upper pivot member pivotably connected to the spine and pivotably connected to the post;
a lower pivot member pivotably connected to the spine below the upper pivot member, and pivotably connected to the post below the upper pivot member, wherein one of the pivot members has a handle which extends away from the post, such that the first box is on one side of the post and the handle is on another side of the post, such that operating the handle causes the first box to descend or ascend, the handle being operable to move the first box between a lowered access position and an elevated operating position; and
at least one latch disposed to secure the pivot members to thereby position the first box at a desired elevation with respect to the post.

15. A beehive assembly comprising:
an upright support post;
an upright spine;
a base bracket fixed to the spine;
a first box supported on the base bracket, the first box being configured to receive portions of a beehive colony therein;
a second box which is positioned above the first box and in communication therewith to allow bees within the first box to pass into the second box, wherein the first box and the second box are releasably fixed to the spine, the first box and the superposed second box defining a hive column which is rigidified by the spine;
a mechanism connecting the upright spine to the post which is operable to cause the hive column to ascend, and further being operable to move the hive column between a lowered access position and an elevated operating position, while retaining the orientation of the second box above the first box; and at least one latch disposed to secure the hive column at a desired elevation with respect to the post.

16. The beehive assembly of claim 15 further comprising a latch plate fixed to the spine and extending from the spine alongside the upright support post, the latch plate having portions defining a first opening therein;
   wherein the at least one latch comprises a first latch assembly mounted to the upright support post and having a movable projecting member which is actuatable by a user to selectively protrude through the first opening of the latch plate, to thereby retain the spine in a first elevated position;
   wherein the latch plate has portions defining a second opening therein, the second opening being positioned outward of the first opening in a direction away from the spine; and the at least one latch further comprising a second latch assembly mounted to the upright support post at an elevation below the first latch assembly, the second latch assembly having a protruding member which is extendible into the second opening to retain the spine in a second elevated position which is below the first elevated position.

17. The beehive assembly of claim 15 wherein the spine has a central panel which extends upwardly along and adjacent a vertical panel of the first box, wherein portions of the central panel define a vertically extending slot; and further comprising:
   a bracket disposed on a side of the spine opposite the upright support post and having a vertical segment which overlies the spine central panel and a horizontal segment which extends over the hive column; and
   a fastener which extends from the bracket vertical segment through the spine central panel vertically extending slot, the fastener being adjustable to releasably secure the bracket to the spine to clamp the hive column in position with respect to the spine.

18. The beehive assembly of claim 15 wherein the mechanism connecting the upright spine to the post comprises:
   two upper parallel members each pivotably mounted between the upright support post and the spine, and
   two lower parallel members each pivotably mounted between the upright support post and the spine, both of the lower parallel members being positioned below the two upper parallel members.

19. The beehive assembly of claim 18 wherein the two upper parallel members are pivotably connected to the post about a post upper fastener, and the two lower parallel members are pivotably connected to the spine about a spine lower fastener, and further comprising at least one biasing member extending between the post upper fastener and the spine lower fastener, the biasing member urging the spine lower fastener towards the post upper fastener.

20. The beehive assembly of claim 18 further comprising a handle releasably mounted to the two upper parallel members.

\* \* \* \* \*